United States Patent
Lewis et al.

(10) Patent No.: US 8,537,976 B2
(45) Date of Patent: Sep. 17, 2013

(54) SYSTEM AND METHOD FOR HANDLING TELEPHONE INTERRUPTIONS

(75) Inventors: Sheena Lewis, Hawthrone, NY (US); Kenya Freeman Oduor, Morrisville, NC (US); Philippa Mignon Rhodes, Raleigh, NC (US); Ellen J. Yoffa, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 834 days.

(21) Appl. No.: 12/702,916

(22) Filed: Feb. 9, 2010

(65) Prior Publication Data
US 2011/0194678 A1    Aug. 11, 2011

(51) Int. Cl.
    *H04M 1/64*    (2006.01)
(52) U.S. Cl.
    USPC .......................................... 379/70; 379/88.22
(58) Field of Classification Search
    USPC .................................. 379/88.22, 70
    See application file for complete search history.

(56) References Cited

U.S. PATENT DOCUMENTS

| | | | |
|---|---|---|---|
| 5,471,519 A * | 11/1995 | Howe et al. | 379/88.26 |
| 5,784,438 A | 7/1998 | Martinez | |
| 5,943,402 A * | 8/1999 | Hamel et al. | 379/88.26 |
| 5,960,064 A * | 9/1999 | Foladare et al. | 379/88.26 |
| 6,411,805 B1 | 6/2002 | Becker et al. | |
| 6,453,023 B1 * | 9/2002 | McKee | 379/88.25 |
| 6,871,214 B2 | 3/2005 | Parsons et al. | |
| 7,035,385 B2 * | 4/2006 | Levine et al. | 379/88.23 |
| 7,228,145 B2 | 6/2007 | Burritt et al. | |
| 2008/0069313 A1 * | 3/2008 | Simpson et al. | 379/88.12 |
| 2009/0207982 A1 * | 8/2009 | O'Connell et al. | 379/88.23 |
| 2009/0245486 A1 * | 10/2009 | Lingafelt et al. | 379/88.23 |
| 2010/0091956 A1 * | 4/2010 | Gopal | 379/88.12 |

\* cited by examiner

*Primary Examiner* — Joseph T Phan
(74) *Attorney, Agent, or Firm* — Cahn & Samuels, LLP (57) ABSTRACT

A system and method for handling telephone call interruptions from a common telephone number or common user that provides the user with intelligent options to efficiently manage the interruption. The system is particularly efficient in handling interruptions that involve voicemail messages. The system identifies matches of outgoing calls to and incoming calls from common numbers and/or users and presents various options to the user to handle the call. These options include allowing the user to cancel or delete voicemail messages that are in progress while simultaneously accepting the incoming call.

20 Claims, 5 Drawing Sheets

| | Outgoing Call | Incoming Call | |
|---|---|---|---|
| 510A | 555-555-4444 | 555-555-4444 | 520A |
| 510B | 800-333-1234 | 800-333-12XX | 520B |
| 510C | John Doe | John Doe | 520C |
| 510D | Acme Corporation | Acme Corporation | 520D |

SYSTEM AND METHOD FOR HANDLING TELEPHONE INTERRUPTIONS

I. FIELD OF THE INVENTION

The present invention relates generally to a system and method for handling incoming and outgoing telephone calls. More particularly, the present invention provides a system and method that provides telephone users multiple options for intelligently handling interruptions involving simultaneous incoming and/or outgoing calls between common telephone numbers or users.

II. BACKGROUND OF THE INVENTION

The telephone is one of the paramount inventions of all-time. In recent years there has been tremendous growth in telecommunications technology, availability and use. One of the most subscribed and utilized telecommunication services is call waiting which allows users the option of connecting to an incoming call while they are on the phone with a current call. However, there are some known problems that call waiting has introduced as a result.

One of the more common problems occurs when a user places a phone call, is directed to voicemail when the recipient does not answer, and is interrupted by the recipient returning the call. Current systems, when presented with this problem, provide users with the option to: 1) ignore the incoming call and continue to leave the message, 2) accept the incoming call and allow the voicemail feature to hang up by itself, typically after it has exhausted the maximum time allotted for voicemail messages, or 3) accept the incoming call, ask the incoming caller to hold while the first call is being ended, switch back to the voicemail message and attempt to end the call with the voicemail, and finally switch back to the incoming caller.

Each of the options provided by the current systems has shortcomings. The first option compels the user to ignore the incoming call only to have to return the call later. In this scenario, both users may receive voicemail messages and attempt to return the call later which increases the chances that the same situation may occur again. The second option is problematic because it forces the user to end the voicemail message and allow the voicemail to continue indefinitely. Some voicemail systems, particularly certain cellular systems, do not allow messages to be deleted until they are played in their entirety. This process subjects the calling user to expending additional airtime minutes or being billed additional fees for the minutes consumed by leaving to the message. Further, the receiving user's voicemail would be cluttered with an obsolete message and that user would also be subjected expending additional airtime minutes or being billed additional fees for the minutes consumed by listening to the message. The third option presents a risk of hanging up on the incoming caller and may be deemed as both unprofessional and inconsiderate.

III. SUMMARY OF THE INVENTION

The present invention provides a system and method to overcome the problems of the prior art. The present invention provides a system and method to intelligently handle telephone call interruptions when the incoming and outgoing calls are from a common telephone number and/or user, including voicemail messages. The present invention provides users with multiple options to address call interruptions from common telephone numbers and/or users, including 1) cancelling a voicemail message, ending the outgoing call, and accepting the incoming call; 2) rejecting an incoming call and continuing the current call; or 3) switching between the current call and the incoming call.

The present invention in at least one embodiment provides a method including storing information related to an outgoing telephone call in a memory module; storing information related to an incoming telephone call in a memory module; comparing said information related to said outgoing call and said information related to said incoming call when said outgoing call and said incoming call occur simultaneously; determining whether a match exists between said outgoing call information and said incoming call information; and when it is determined that a match exists, presenting an option that allows a user to simultaneously delete a voicemail message being recorded, end the outgoing telephone call, and accept the incoming telephone call.

The present invention in at least one embodiment provides a system including means for storing information related to an outgoing telephone call in a database; means for storing information related to an incoming telephone call in said database; means for comparing said information related to said outgoing call and said information related to said incoming call when said outgoing call and said incoming call occur simultaneously; means for determining whether a match exists between said outgoing call information and said incoming call information; and when it is determined that a match exists, means for presenting an option that allows a user to simultaneously delete a voicemail message being recorded, end the outgoing telephone call, and accept the incoming telephone call.

The present invention in at least one embodiment provides a computer program product comprising a computer useable medium including a computer readable program, wherein the computer readable program when executed on a computer causes the computer to store information related to an outgoing telephone call in a database; store information related to an incoming telephone call in said database; compare said information related to said outgoing call and said information related to said incoming call when said outgoing call and said incoming call occur simultaneously; determine whether a match exists between said outgoing call information and said incoming call information; and when it is determined that a match exists, present an option that allows a user to simultaneously delete a voicemail message being recorded, end the outgoing telephone call, and accept the incoming telephone call.

IV. BRIEF DESCRIPTION OF THE DRAWINGS

The present invention is described with reference to the accompanying drawings, wherein.

Given the following enabling description of the drawings, the invention should become evident to a person of ordinary skill in the art.

V. DETAILED DESCRIPTION OF THE DRAWINGS

Call interruptions from common telephone numbers and/or users often occur following missed (or unanswered) calls and the return call of these missed calls. When placing an unanswered call, the caller is often prompted to leave a voice message or voicemail for the intended call recipient. The intended recipient often returns the missed call while the caller is still leaving the voicemail for the recipient. The present invention in at least one exemplary embodiment provides a system and method that identifies and handles calls involving common telephone numbers and/or common users. The system of the present invention determines whether a match of the outgoing and incoming call exists in order to determine whether intelligent call interruption handling option will be used. A match may be based on common telephone numbers or common users. Common telephone numbers may be an identical number or numbers that differ by a certain number of digits, e.g., one or two terminal digits. Common users may be a common individual, entity, business, etc. The invention may be practiced with all digital telephone devices including cellular, mobile, wired, landline, and internet based devices, such as Voice over Internet Protocol (VoIP).

When a call is interrupted by an incoming call, the system determines whether the incoming call is from a common telephone number or common user as the person being called in the existing call. This determination may be made, for example, by querying the telephone memory, i.e., contacts, address book, call log, etc., to determine whether a match exists. If the incoming call is from a common number or user, the system provides options to the user in order to intelligently handle the interruption. When the system determines that the outgoing call and incoming call are from different users, the system allows the device to handle the call normally without the additional options provided by the present invention.

Figure 1:
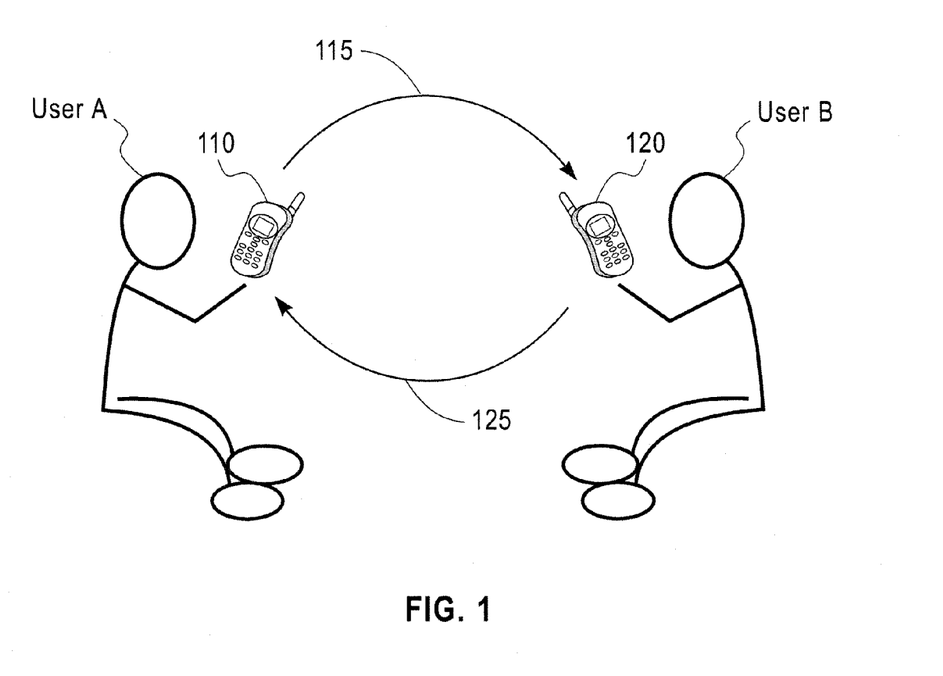
FIG. 1 illustrates an exemplary overview of the present invention.

FIG. 1 illustrates an exemplary overview of the system of the present invention. User A utilizes a cellular or wired telephone device 110 equipped with the system of the present invention to place an outgoing telephone call 115. The call 115 is placed to telephone device 120 of User B. User B fails to answer the call 115 placed by User A and User A is transferred into the voicemail system of User B. User A begins to leave a voicemail message for User B. While User A is leaving the voicemail message User B realizes that he/she missed call 115 and initiates a call 125 to User A while User A is still leaving the voicemail message to User B. When call 125 is received by telephone 110 of User A, the system of the present invention queries the memory of device 110 and determines whether incoming call 125 is from the same user as outgoing call 115. Upon determining that the outgoing call 115 and the incoming call 125 are associated with the same user (i.e., User B), the system prompts device 110 to present various call interruption handling options to User A.

Figure 2:
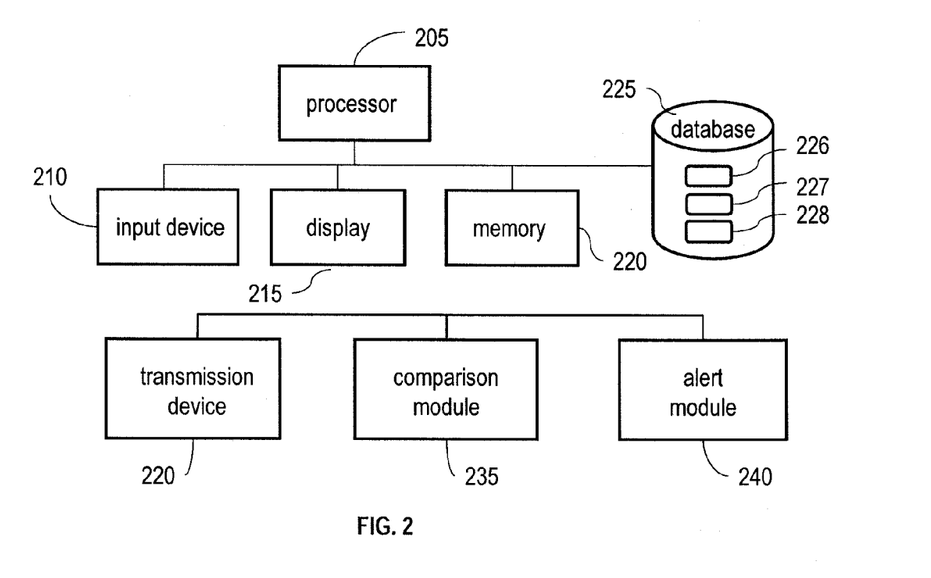
FIG. 2 illustrates a system in accordance with an exemplary embodiment of the present invention.

FIG. 2 illustrates an exemplary system according to an embodiment of the present invention. The exemplary system 200 of the present invention, as illustrated in FIG. 2, includes a processor 205, input device 210, display 215, memory 220, database 225 including one or more of lists 226, 227, and 228, transmission module 230, and comparison module 235. The components that comprise system 200 are components common to modern communication devices. Input device 210 and/or display 215 may be programmed to enable the user interruption handling options. Memory 220 and/or database 225 may include optional lists 226-228, e.g., call log, caller identification, address book, etc. All outgoing and incoming calls are transmitted via transmission module 230. The memory 220 and database 225 including the various lists 226-228 enable the system to perform a comparison of outgoing and incoming calls via comparison module 235 in order to determine whether a match of the outgoing and incoming calls exists. All simultaneous calls are reviewed by the comparison module 235. If the comparison module 235 determines that there is a match between an outgoing and incoming call, the alert module 240 is prompted to alert the user. The alert may be, for example, a unique audible or visible alert. The system also provides the user with a list of options to intelligently handle the call interruption.

Figure 3:
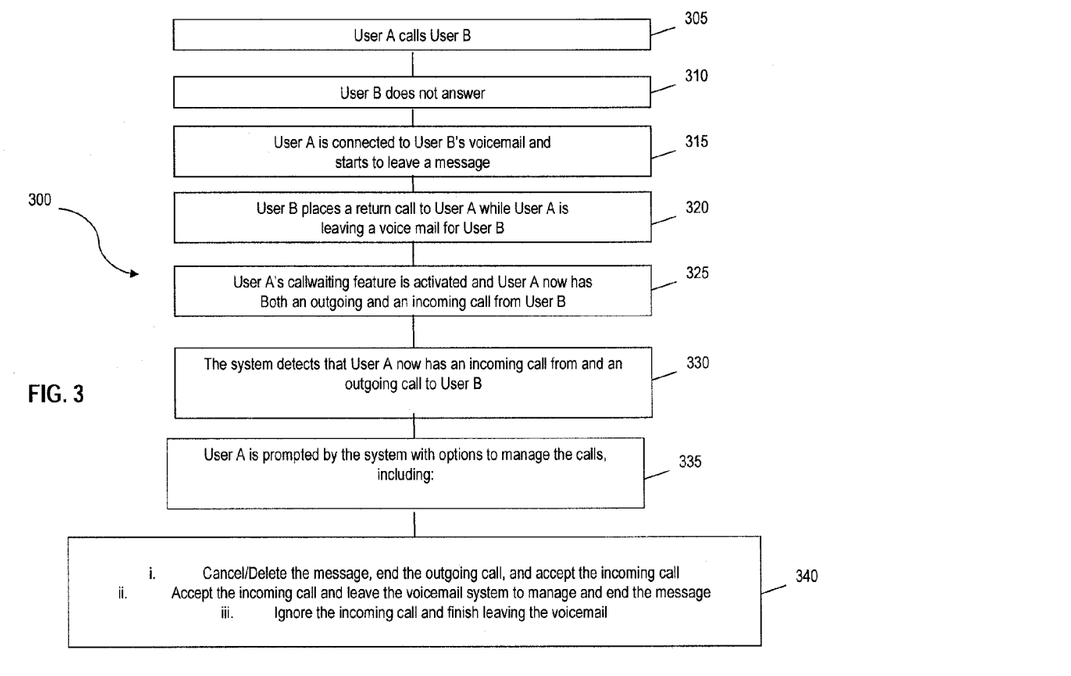
FIG. 3 illustrates a method in accordance with an exemplary embodiment of the present invention.

FIG. 3 illustrates a method according to an embodiment of the present invention. The method 300 begins at 305 when User A places a call to User B. At 310, User B fails to answer User A's call. At 315, User A is connected to User B's voicemail and begins to record a voicemail message. At 320, User B places a return call to User A while User A is still leaving a voicemail message for User B. At 325, User A's call waiting feature is activated. User A now has both an outgoing and incoming call to User B. At 330, the system detects that User A has both an outgoing call to and incoming from User B. At 335, the system prompts options to intelligently manage the outgoing and incoming calls. At 340, the system presents various options to User A to manage the outgoing and incoming calls. The options include: a) simultaneously canceling/deleting the voicemail message that is currently being placed, ending the outgoing call, and accepting the incoming call; b) accepting the incoming call and allowing the voicemail system to manage and end the voicemail message; and c) ignoring the incoming call and completing the voicemail message. When the system determines that the outgoing call and incoming call are from different users, the system allows the device to handle the call normally without the additional options provided by the present invention. It is noted that with Option A the voicemail message (either partial or complete) that User A begins to leave is not saved, and User B is not notified that a voicemail message was being left.

Figure 4:
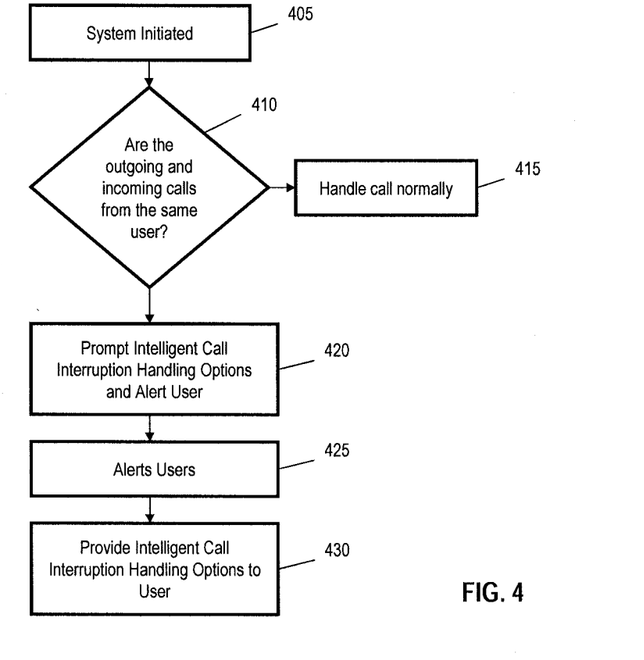
FIG. 4 illustrates a method in accordance with an exemplary embodiment of the present invention.

FIG. 4 illustrates a flowchart according to an exemplary embodiment of the present invention. The process begins at 405 with the system being initiated by a call attempted to be transmitted or received during an ongoing call. At 410, the system determines whether the outgoing and incoming calls involve a common user. If no, the system proceeds to 415 and handles the incoming call normally. Normal call handling options allow the user to: a) accept the incoming call and allow telephone system to end the previous call, e.g., allowing a voicemail system to manage and end an ongoing voicemail message; or, b) ignore the incoming call and complete the ongoing call, e.g., finish leaving a voicemail message. If yes at 410, the system proceeds to 420 and prompts the intelligent call interruption handling options. At 425, the system alerts the user of the intelligent call interruption handling options. At 430, the system presents the intelligent call interruption handling options to the user for selection via the user display or input device. The intelligent call interruption handling options include the additional call handling option of simultaneously canceling/deleting the message, ending the outgoing call, and accepting the incoming call.

Figure 5:
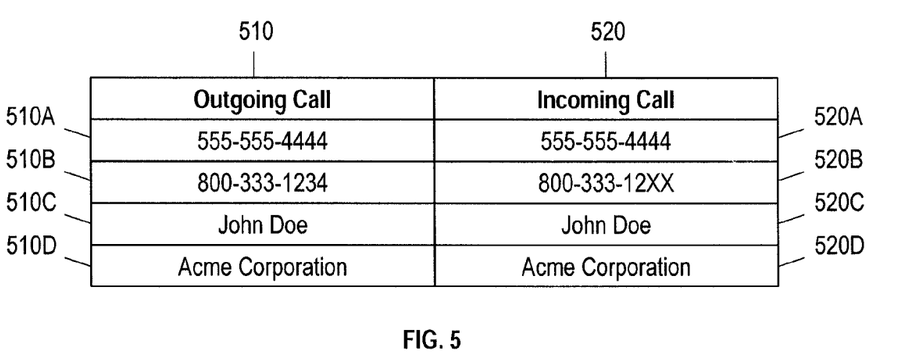
FIG. 5 illustrates an aspect of the system and method in accordance with an exemplary embodiment of the present invention.

FIG. 5 illustrates an aspect of the system and method according to an exemplary embodiment of the present invention. FIG. 5 illustrates examples of simultaneous call comparisons performed by the comparison module 235. Comparison module 235 evaluates outgoing calls 510 and incoming calls 520 in order to determine whether a match between exists between the calls. Matches may be based on be based on common users. For example, matches may be determined to exist between: identical numbers such as 510A and 520A; number that differ by only one or two terminal digits such as 510B and 520B; identical individuals such as 510C and 510D; identical entities such as 510D and 520D; or the like. Matches between outgoing calls and incoming calls may also be made based on other call lists or caller information such as call logs, caller identification (caller ID) lists, address book entries, etc.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute with the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

VI. INDUSTRIAL APPLICABILITY

The above-described invention is useful for efficiently providing telephone users with multiple options for intelligently handling telephone call interruptions that involve simultaneous outgoing and incoming calls between common numbers and/or common users.

We claim:

1. A method comprising:
    storing information related to an outgoing telephone call in a memory module;
    storing information related to an incoming telephone call in a memory module;
    comparing said information related to said outgoing call and said information related to said incoming call when said outgoing call and said incoming call occur simultaneously;
    determining whether a match exists between said outgoing call information and said incoming call information, the match being based on numbers that differ by two or less digits; and
    when it is determined that a match exists, presenting an option that allows a user to simultaneously delete a voicemail message being recorded, end the outgoing telephone call, and accept the incoming telephone call.

2. The method according to claim 1, wherein said information related to an outgoing call includes at least one of the telephone number and name of call recipient.

3. The method according to claim 1, wherein said information related to an incoming call includes at least one of the telephone number and name of caller.

4. The method according to claim 1, wherein said comparison is performed by a comparison module.

5. The method according to claim 1, wherein the match is based on database matches.

6. The method according to claim 1, wherein the match is based on at least one of identical names of businesses and identical names of entities.

7. A system comprising:
    means for storing information related to an outgoing telephone call in a database;
    means for storing information related to an incoming telephone call in said database;
    means for comparing said information related to said outgoing call and said information related to said incoming call when said outgoing call and said incoming call occur simultaneously;
    means for determining whether a match exists between said outgoing call information and said incoming call information, the match being based on numbers that differ by two or less digits; and
    when it is determined that a match exists, means for presenting an option that allows a user to simultaneously delete a voicemail message being recorded, end the outgoing telephone call, and accept the incoming telephone call.

8. The system according to claim 7, wherein said means for storing information related to an outgoing call includes means for storing at least one of the telephone number and name of call recipient.

9. The system according to claim 7, wherein said means for storing information related to an incoming call includes means for storing at least one of the telephone number and name of caller.

10. The system according to claim 7, wherein said means for comparing bases the match on database matches.

11. The system according to claim 7, wherein the match is based on at least one of identical names of businesses and identical names of entities.

12. A computer program product comprising a non-transitory computer useable medium including a computer readable program, wherein the computer readable program when executed on a computer causes the computer to:
    store information related to an outgoing telephone call in a database;
    store information related to an incoming telephone call in said database;
    compare said information related to said outgoing call and said information related to said incoming call when said outgoing call and said incoming call occur simultaneously;
    determine whether a match exists between said outgoing call information and said incoming call information, the match being based on numbers that differ by two or less digits; and
    when it is determined that a match exists, present an option that allows a user to simultaneously delete a voicemail message being recorded, end the outgoing telephone call, and accept the incoming telephone call.

13. The computer program product according to claim 12, wherein said information related to an outgoing call includes at least one of the telephone number and name of call recipient.

14. The method computer program product according to claim 12, wherein said information related to an incoming call includes at least one of the telephone number and name of caller.

15. The computer program product according to claim 12, wherein said comparison is performed by a comparison module.

16. The computer program product according to claim 12, wherein the match is database matches.

17. The computer program product according to claim 16, wherein the match is based on at least one of identical names of businesses and identical names of entities.

18. A method comprising:
    storing information related to an outgoing telephone call in a memory module;
    storing information related to an incoming telephone call in a memory module;
    comparing said information related to said outgoing call and said information related to said incoming call when said outgoing call and said incoming call occur simultaneously;

determining whether a match exists between said outgoing call information and said incoming call information, the match being based on:
  numbers that differ by two or less terminal digits, and
  at least one of identical business names and identical entity names; and
when it is determined that a match exists, presenting an option that allows a user to simultaneously delete a voicemail message being recorded, end the outgoing telephone call, and accept the incoming telephone call.

19. The method according to claim 18, wherein said information related to an outgoing call includes the telephone number and name of call recipient.

20. The method according to claim 18, wherein said information related to an incoming call includes the telephone number and name of caller.

* * * * *